(12) United States Patent
Brenden et al.

(10) Patent No.: US 7,145,742 B2
(45) Date of Patent: Dec. 5, 2006

(54) VELOCITY CONTROLLED DISK DRIVE HEAD RETRACTION AFTER POWER LOSS

(75) Inventors: Jason P. Brenden, Woodbury, MN (US); James A. Dahlberg, Eagan, MN (US)

(73) Assignee: Agere Systems, Inc., Allentown, PA (US)

( * ) Notice: Subject to any disclaimer, the term of this patent is extended or adjusted under 35 U.S.C. 154(b) by 60 days.

(21) Appl. No.: 10/955,713

(22) Filed: Sep. 30, 2004

(65) Prior Publication Data

US 2006/0066980 A1 Mar. 30, 2006

(51) Int. Cl.
*G11B 21/02* (2006.01)

(52) U.S. Cl. ........................................................ 360/75

(58) Field of Classification Search ...................... None
See application file for complete search history.

(56) References Cited

U.S. PATENT DOCUMENTS

| | | | | |
|---|---|---|---|---|
| 3,626,264 A | * | 12/1971 | Halfhill et al. | ............. 388/816 |
| 5,982,130 A | * | 11/1999 | Male | ........................... 318/615 |
| 6,040,671 A | | 3/2000 | Brito et al. | |
| 6,072,666 A | | 6/2000 | Sonderegger et al. | |
| 6,108,157 A | | 8/2000 | Yoneda et al. | |
| 6,140,784 A | * | 10/2000 | Mazda | ....................... 318/280 |
| 6,204,629 B1 | * | 3/2001 | Rote et al. | ................... 318/803 |
| 6,282,049 B1 | * | 8/2001 | Cameron et al. | ............. 360/75 |
| 6,301,082 B1 | | 10/2001 | Sonderegger et al. | |
| 6,324,033 B1 | | 11/2001 | Broom et al. | |
| 6,373,650 B1 | * | 4/2002 | Pedrazzini | ................... 360/75 |
| 6,396,652 B1 | | 5/2002 | Kawachi et al. | |
| 6,512,650 B1 | | 1/2003 | Tanner | |
| 6,594,102 B1 | | 7/2003 | Kanda et al. | |
| 6,667,843 B1 | | 12/2003 | Norman et al. | |
| 6,700,034 B1 | * | 3/2004 | Lindsay et al. | ............. 604/378 |
| 6,721,119 B1 | | 4/2004 | Hassan et al. | |
| 6,765,746 B1 | | 7/2004 | Kusumoto | |
| 2001/0019463 A1 | | 9/2001 | Drouin | |

* cited by examiner

*Primary Examiner*—K. Wong
(74) *Attorney, Agent, or Firm*—Kinney & Lange, P.A.

(57) ABSTRACT

A control apparatus controls retraction of a device carried on a moveable member actuated by an electric motor after a sudden power loss. The control apparatus includes a measuring circuit for measuring a back electromotive force (back EMF) from the electric motor during a measuring phase. The control apparatus also includes a controller which receives the actual velocity and provides a command signal for controlling a magnitude of the drive current based on a commanded velocity and the actual velocity of the moveable member. The control apparatus further comprises a current control loop for providing a command current signal based on the current provided to the electric motor and the command signal, and for providing the electric motor with the drive current during a driving phase based on the command current signal.

29 Claims, 2 Drawing Sheets

VELOCITY CONTROLLED DISK DRIVE HEAD RETRACTION AFTER POWER LOSS

BACKGROUND OF THE INVENTION

The present invention relates to disk drives and storage medium devices. In particular, the present invention relates to velocity control of a disk drive actuator during retraction in a power loss situation.

Generally, a magnetic hard disk drive (HDD) includes a magnetic read/write head and several magnetic disks, each disk having concentric data tracks for storing data. The disks are mounted on a spindle motor, which causes the disks to spin. The read/write head is typically mounted on a slider, which is mounted to a suspension or load beam. The load beam is attached to an actuator arm of an actuator, which moves the read/write head over the spinning disk during operation. As the disks spin, the slider suspended from the actuator arm "flies" a small distance above the disk surface. The slider carries a transducing head for reading from or writing to a data track on the disk.

In addition to the actuator arm, the slider suspension comprises a bearing about which the actuator arm pivots. A large scale actuator motor, such as a voice coil motor (VCM), is used to move the actuator arm (and the slider) over the surface of the disk. When actuated by the VCM, the actuator arm can be moved from an inner diameter to an outer diameter of the disk along an arc until the slider is positioned above a desired data track on the disk.

A control circuit is coupled to a coil in the VCM in order to controllably supply current to the coil. When a current is passed through the coil, a motive force is exerted on the actuator arm. The actuator arm is subjected to a force tending to accelerate the actuator arm at a rate defined by the magnitude of the current, and in a direction defined by the polarity of the current. Thus, in order to accelerate or decelerate the actuator arm until it is moving at a desired velocity and in a desired direction, it is important to know the actual direction and velocity of the actuator arm. It is known that the back electromotive force (back EMF) from the coil of the actuator is representative of the velocity and direction of movement of the actuator arm.

Parking zones in an HDD allow the read/write head to be safely landed after the hard drive has ceased operation. When an HDD is powered down, it usually performs certain operations before actually disconnecting from the external power source. One of these power down operations is to operate the actuator arm to move the head to the parking zone. If the head is not moved to the parking zone prior to power down, the head will land on the disk after the disk stops spinning, potentially damaging the disk and the read/write head.

In the event of a catastrophic shut down (i.e., external power is suddenly removed) there is no external power to perform power down procedures, including moving the head to the parking zone. Instead, power must be extracted from the spinning spindle motor. Due to the limited current available from the generator source during a power loss situation, the current used to move the actuator arm must be limited.

Various systems have been developed to control velocity during retract. One such system includes measuring the back EMF of the actuator to determine the velocity compensation required for stability. The VCM is then driven with a voltage to control the velocity of the actuator arm. A disadvantage of this system is the need for additional switched capacitor amplifiers, which makes programming the compensation over a wide range of motors difficult. Furthermore, because the VCM is driven in voltage mode, the pole of the motor limits the ramp-up of the current in the VCM, and the current cannot be directly controlled or limited.

A further approach to retracting the read/write head during power loss situations involves adjusting the voltage drive on the VCM until the velocity lies within predetermined thresholds. However, this approach is disadvantageous because the target is a range of velocities, thus allowing the velocity to be anywhere in that range. As a result, the accuracy of the final velocity of the actuator arm is inherently less than if a specific velocity is targeted.

Thus, there is a need for a system which reliably controls the retract velocity of a read/write head while limiting the current used in a power loss situation.

BRIEF SUMMARY OF THE INVENTION

The present invention is a control apparatus for controlling retraction of a device carried on a moveable member actuated by an electric motor after a sudden power loss. The control apparatus includes a measuring circuit for measuring a back electromotive force (back EMF) from the electric motor during a measuring phase. The back EMF from the electric motor is used to determine an actual velocity of the moveable member. The control apparatus also includes a controller which receives the actual velocity and provides a command signal for controlling a magnitude of the drive current based on the difference between a commanded velocity and the actual velocity of the moveable member. The control apparatus further comprises a current control loop for providing a command current signal based on the current provided to the electric motor and the command signal, and for providing the electric motor with the drive current during a driving phase based on the command current signal.

DETAILED DESCRIPTION

Figure 1:
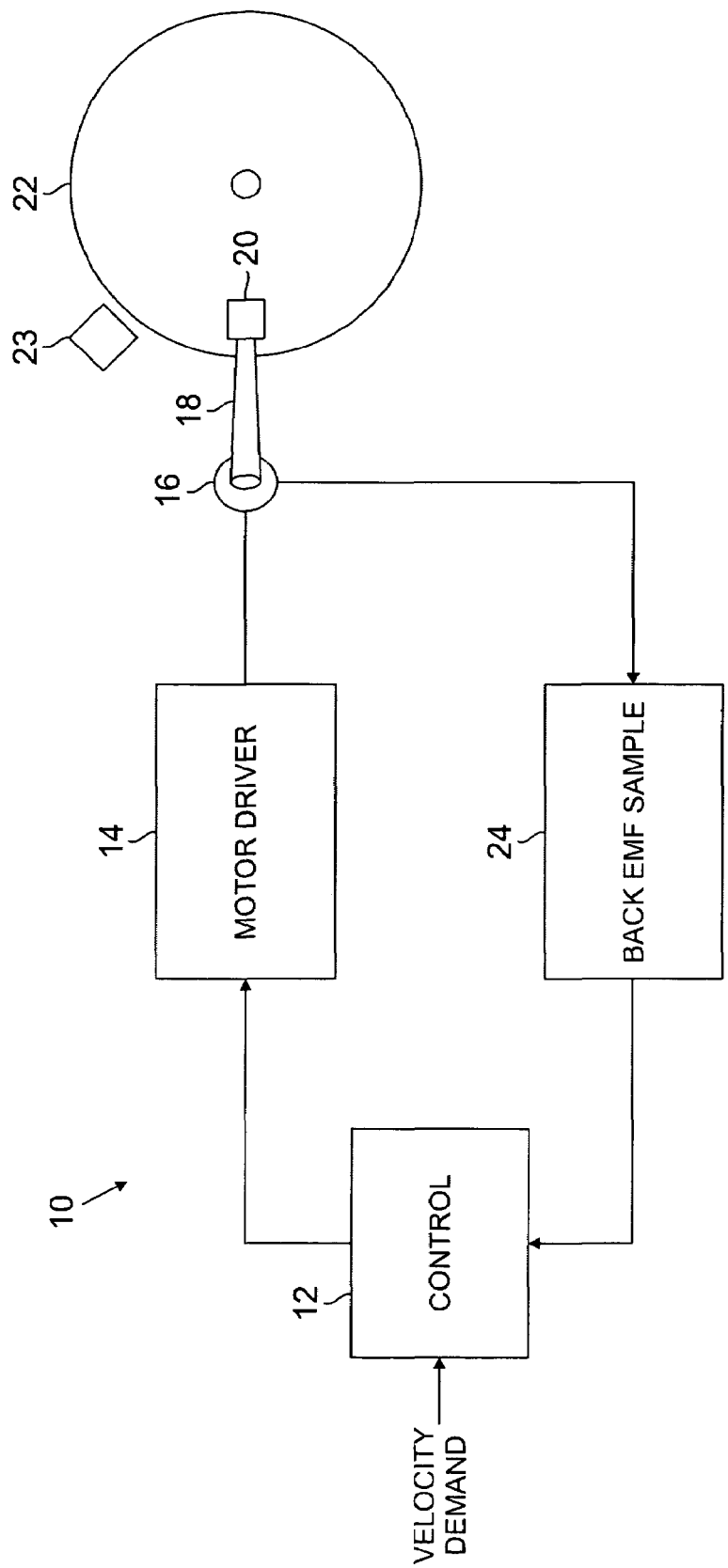
FIG. 1 is a block diagram of a typical velocity controlled disk drive head retraction control system.

FIG. 1 is a block diagram of typical velocity controlled disk drive head retraction control system 10. Disk drive head retraction control system 10 includes control block 12, motor driver block 14, motor 16, actuator arm 18, transducing head 20, disk 22, parking location 23, and back electromotive force (back EMF) sampling block 24. Control block 12 receives a velocity demand signal as an input and provides a control signal to motor driver block 14. Motor driver block 14 is connected to motor 16 and provides a drive current to motor 16 to move actuator arm 18. Back EMF sampling block 24 is connected to motor 16 to sample the back EMF from motor 16. Back EMF sampling block 24 provides a signal to control block 12.

In normal operation, a drive current is provided to motor 16 to actuate actuator arm 18. When actuated by motor 16, actuator arm 18 can be moved from an inner diameter to an outer diameter of disk 22 along an arc until transducing head 20 is positioned above a desired data track on disk 22. Disk 22 includes a plurality of concentric tracks on which data and position information is recorded. Disk 22 is mounted on a spindle motor, which causes disk 22 to spin. Transducing head 20 suspended from actuator arm 18 flies above the surface of disk 22 as it spins. Transducing head 20 is operable to read the data and position information from tracks of disk 22 and generate an input signal representative of the data and position information.

When a disk drive is powered down, it usually performs certain operations before actually disconnecting from the external power source. One of these power down operations is to operate actuator arm 18 to move transducing head 20 to parking location 23. Parking location 23 allows transducing head 20 to be safely landed after the disk drive has ceased operation. Parking location 23 is located at the outermost edge of disk 22 and typically includes a ramp to raise transducing head 20 and park it off of disk 22 in an elevated position. Alternatively, parking location 23 may be located at the innermost edge of disk 22. If the head is not moved to parking location 23 prior to power down, the head will land on disk 22 after disk 22 stops spinning, potentially damaging disk 22 and transducing head 20.

In the event of a catastrophic shut down (i.e., external power is suddenly removed), there is no external power to perform power down procedures, including moving transducing head 20 to parking location 23. Typically, the momentum of the spinning disk operates the spindle motor to generate a back electromotive force at the motor terminals, which is rectified and stored to provide power to disk drive head retraction control system 10 upon a catastrophic shut down. However, the power available to power motor 16 is limited by the spindle motor resistance and the back electromotive force of the spindle motor.

Disk drive head retraction control system 10 is a typical implementation of a system to retract transducing head 20 in a catastrophic power loss situation. To conserve power, control system 10 alternately drives motor 16 with a drive current during a driving phase and measures the back EMF from the motor 16 during a measuring phase. The back EMF from motor 16 is representative of the velocity and direction of movement of actuator arm 18.

During the driving phase, control block 12 receives a velocity demand signal representing a preferred retraction velocity and direction of transducing head 20. The velocity demand signal is typically a programmable value stored in a register or other storage device. The torque load encountered by transducing head 20 as it traverses its path in a retract operation varies considerably with position. Consequently, control block 12 must constantly adjust the drive current to transducing head 20 to correspond to the velocity demand signal. Control block 12 provides a signal to motor driver block 14 corresponding to the drive current necessary to adjust the actual velocity of the transducing head 20 to correspond to the preferred velocity of the velocity demand signal. Motor driver block 14 amplifies this signal and drives motor 16 with a drive current to accelerate or decelerate retraction of transducing head 20 toward parking location 23.

During the measuring phase, the drive current to motor 16 is disabled. Subsequently, the back EMF from motor 16 is sampled by back EMF sample block 24. Preferably, the back EMF from motor 16 is sampled a plurality of times during the measuring phase and averaged to provide an average back EMF signal. The back EMF signal is then amplified by back EMF sample block 24 and passed to control block 12. This signal represents the actual velocity of transducing head 20. Control block 12 then uses the sampled back EMF signal to compare the actual velocity of transducing head 20 with the preferred velocity of the velocity demand signal.

The driving phase then begins again as control block 12 provides a signal to motor driver block 14 corresponding to the drive current necessary to adjust the velocity of transducing head 20 to correspond to the preferred velocity of the velocity demand signal.

Figure 2:
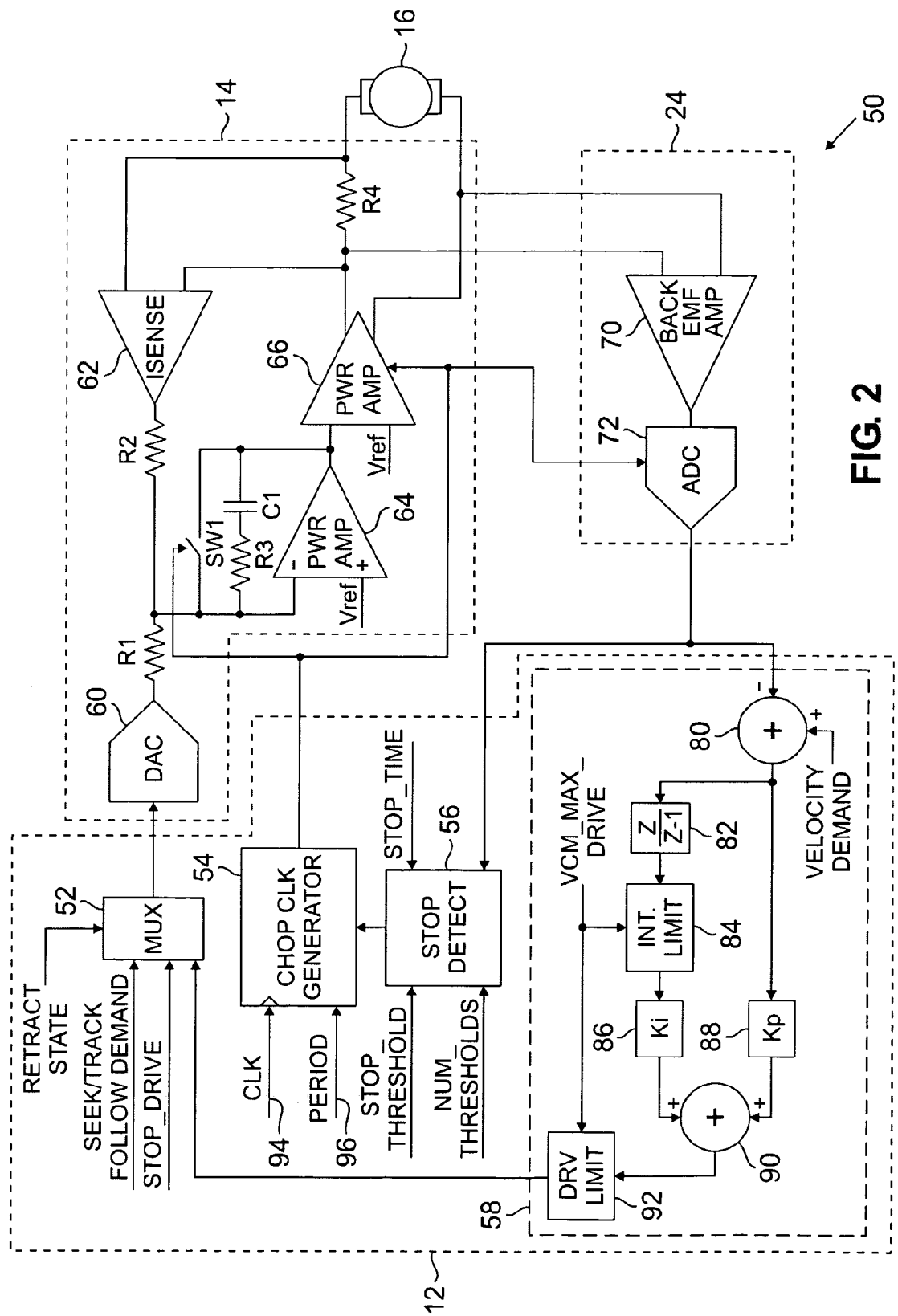
FIG. 2 is a schematic diagram of a velocity controlled disk drive head retraction control system according to the present invention.

FIG. 2 is a schematic diagram of velocity controlled disk drive head retraction control system 50 according to an embodiment of the present invention. Retraction control system 50 includes the same functional blocks shown and described with regard to FIG. 1, including control block 12, motor driver block 14, motor 16, and back EMF sample block 24. Each of these blocks is shown in more detail in FIG. 2. Control block 12 includes multiplexer 52, chop clock generator circuit 54, stop detect circuit 56, and proportional integral (PI) controller 58. Motor driver block 14 includes a current control loop including digital-to-analog converter (DAC) 60, current sense amplifier 62, error amplifier 64, power amplifier 66, switch SW1, resistors R1, R2, R3, and R4, and capacitor C1. Back EMF sample block 24 includes back EMF amplifier 70 and analog-to-digital converter (ADC) 72.

Multiplexer (MUX) 52 controls the signal that is passed to motor driver block 14. The output of MUX 52 is connected to DAC 60. Current sense amplifier 62 has inputs connected across resistor R4 at one terminal of motor 16. The outputs of DAC 60 (via resistor R1) and current sense amplifier 62 (via resistor R2) are connected to the inverting input of error amplifier 64. Error amplifier 64 has a feedback network connected between its inverting input and its output, including resistor R3 and capacitor C1 in parallel with switch SW1. The output of error amplifier 64 is connected to an input of power amplifier 66. Both error amplifier 64 and power amplifier 66 have an input connected to a reference voltage $V_{REF}$. The outputs of power amplifier 66 are connected across motor 16. The inputs of back EMF amplifier 70 are connected across motor 16, and the output of back EMF amplifier 70 is provided to ADC 72. The output of ADC 72 is provided to PI controller 58 and stop detect circuit 56.

PI controller 58 includes subtracter 80, accumulator 82, integral limiter 84, integral compensator 86, proportional compensator 88, adder 90, and drive limiter 92. Subtracter 80 subtracts the output of ADC 72 from a velocity demand signal and provides a signal to accumulator 82 and proportional compensator 88. Accumulator 82 is connected to integral limiter 84, and integral limiter 84 is connected to integral compensator 86. The outputs of integral compensator 86 and proportional compensator 88 are summed by adder 90. This sum is provided to drive limiter 92, which in turn provides a signal to MUX 52.

Chop clock generator 54 receives system clock 94, nominal period 96, and an output from stop detect circuit 56 as inputs, and provides a chop clock output signal to switch SW1, the tri-state input of power amplifier 66, and ADC 72. Stop detect circuit 56 has the output of ADC 72 and three programmable signals as inputs. The three programmable signals include STOP_THRESHOLD, NUM_THRESHOLDS, and STOP_TIME.

MUX 52 has three input signals: seek/track follow demand, STOP_DRIVE, and the output of PI controller 58. MUX 52 provides one of the three input signals to motor driver block 14 based on the status of its control input, which is a Retract State signal. The Retract State control input signal is based on the current operating status of the disk drive system. If the disk drive system is operating under normal conditions (i.e., non-power loss condition), the value of the Retract State control signal causes the seek/track follow demand signal to be provided to motor driver block 14. The seek/track follow demand signal controls positioning of transducing head 20 over a desired track to read the data and position information from disk 22 and generate a signal representative of the data and position information (see FIG. 1).

If the disk drive system experiences a catastrophic power loss, the Retract State control signal to MUX 52 changes to provide the signal from PI controller 58 to motor driver block 14. The signal from PI controller 58 controls the current demand during retraction of transducing head 20. In essence, MUX 52 allows the same motor driver block 14 to be used in a catastrophic power loss condition as is used in normal operation of the disk drive system. This allows retraction control system 50 to be incorporated into existing analog circuitry that must be present for normal seek and track following demands (e.g., the current control loop of motor driver block 14). As a result, the need for additional circuit components is reduced, and the use of valuable printed circuit board or chip space is minimized.

When a catastrophic power loss occurs, retraction control system 50 alternates between a driving phase and a measuring phase to control retraction of transducing head 20 (FIG. 1). Chop clock generator 54 controls alternating between the driving phase and the measuring phase in retraction control system 50. Chop clock generator 54 preferably produces a chop clock signal that comprises a recurring rectangular or square wave. The chop clock signal is derived from system clock 94 and nominal period 96. In one embodiment, chop clock generator 54 produces a signal that has a constant frequency. The output of chop clock generator 54 is connected to switch SW1, to the tri-state input of power amplifier circuit 66, and to the enabling input of ADC 72. Power amplifier circuit 66 is enabled when its tri-state input is low and ADC 72 is enabled when its enabling input is high. Thus, when the output of chop clock generator 54 transitions to the low state of the rectangular wave, power amplifier circuit 66 is enabled, switch SW1 is open, ADC 72 is disabled, and the driving phase commences. Conversely, when the output of chop clock generator 54 transitions to the high state of the rectangular wave, ADC 72 is enabled, switch SW1 is closed, power amplifier circuit 66 is disabled, and the measuring phase commences.

During the driving phase, the output signal from PI controller 58 (described in more detail below) provides a signal to motor driver block 14 corresponding to the drive current necessary to adjust the actual velocity of the transducing head to coincide with the preferred velocity of the velocity demand signal. The digital signal output from MUX 52 is converted to an analog signal with DAC 60. During the driving phase, motor driver block 14 functions as a transconductance amplifier including a transconductance control loop. A transconductance control loop is used to measure the current to actuator motor 16, convert it to a voltage, and compare it to the analog signal from DAC 60 representing the current command signal. The transconductance motor control circuit includes current sense amplifier 62, error amplifier 64, and power amplifier 66.

Error amplifier 64 receives a voltage from DAC 60, and also receives a voltage from current sense amplifier 62 representative of the drive current flowing to motor 16. Current sense amplifier 62 measures the current to motor 16 by measuring the voltage drop across resistor R4, which is connected in series with motor 16. Resistor R4 typically has a small resistance (e.g., 1 Ω). Current sense amplifier 62 then amplifies the voltage drop across resistor R4 and provides this amplified voltage to error amplifier 64. Error amplifier 64 compares this amplified voltage to the output voltage of DAC 60 and provides an output voltage which represents the voltage that will cause the difference between the output voltages of DAC 60 and current sense amplifier 62 to be zero. Power amplifier 66 receives the output voltage from error amplifier 64. Power amplifier 66 amplifies this voltage across its outputs to yield a voltage which produces the drive current for motor 16 and resistor R4.

Using a current control loop including current sense amplifier 62, error amplifier 64, and power amplifier 66 provides advantages over prior head retraction systems that use a simple voltage amplifier to drive motor 16. For example, a current control loop provides a higher bandwidth than that provided by a simple voltage amplifier. More specifically, if a simple voltage amplifier is used, the charging current would be limited by the pole of motor 16. This pole is generally many times slower than the current control loop, which allows the drive current to settle quickly to the commanded current. This results in a smaller peak current necessary to move transducing head 20 at a given speed. This is significant because in a catastrophic power loss situation the amount of power available to move transducing head 20 is limited.

During the measuring phase, the drive current to motor 16 is disabled and switch SW1 is closed. Switch SW1 is provided in the feedback network of error amplifier 64 to prevent the integrator of the current control loop from saturating while power amplifier 66 is disabled. This eliminates the potential for a large transient to occur when power amplifier 66 is enabled during the next driving phase. The back EMF from motor 16 is then sampled and amplified by back EMF amplifier 70. In one embodiment, multiple back EMF measurements are taken and averaged during each measuring phase to improve the accuracy of the back EMF measurement. The analog back EMF signal is then passed to ADC 62 to produce a digital representation of the back EMF measurement.

The digital back EMF measurement is subsequently provided to PI controller 58 and stop detect circuit 56. Subtracter 80 in PI controller 58 subtracts the digital back EMF measurement from a velocity demand signal representing a preferred retraction velocity and direction of transducing head 20. The output of subtracter 80 is provided to proportional compensator 88, which provides amplification to the input provided. In other words, the output of proportional compensator 88 is some multiple of the input (which may be greater than, less than, or equal to one). In one embodiment, the proportionality factor of proportional compensator 88 is a power of two to simplify the arithmetic hardware implementation of proportional compensator 88. The purpose of proportional compensator 88 is to allow control block 12 to respond better to large errors in the actual velocity of transducing head 20 as compared with the desired, commanded velocity, while ensuring stability in control block 12. The proportionality factor of proportional compensator 88 is programmable and may be adjusted to trade off speed and stability.

The output of subtracter 80 is also provided to accumulator 82, which provides a mathematical integration operation on its input to derive its output. Accumulator 82 accumulates measurements from subtracter 80 to provide a running sum of the difference between the voltages representing the demanded velocity and the actual velocity of transducing head 20. Accumulator 82 provides its output to integral limiter 84. Integral limiter 84 prevents an overflow from occurring in integral compensator 88 due to large errors in the velocity of transducing head 20. The overflow level is determined by a programmable value, VCM_MAX_DRIVE. The output of integral limiter 84 is provided to integral compensator 86, which provides amplification to the input provided. In other words, the output of integral compensator 86 is some multiple of the input (which may be greater than, less than, or equal to one). Integral compensator 88 includes an integral factor that is also programmable and may be adjusted to trade off speed and stability. The response of integral compensator 86 is slower than that of proportional compensator 88, and thus is unsuitable for responding to large errors in velocity. This is why proportional compensator 88 is provided along with integral compensator 86. However, proportional compensator 88 is not optimal for response to large changes in torque load that actuator arm 18 and transducing head 20 may encounter. In such situations, proportional compensator 88 is not adequate to maintain the desired relatively constant velocity. In contrast, integral compensator 86 responds well to large changes in torque load, which are common in head retraction procedures. When a large torque load change is encountered, integral compensator 86 gradually integrates the change in resultant velocity that the torque load change induces and steadily increases the current command to maintain the velocity constant without destabilizing control block 12.

The outputs of integral compensator 86 and proportional compensator 88 are provided to adder 90 and summed together. The output of adder 90 is representative of a voltage corresponding to the drive current necessary to adjust the velocity of transducing head 20 to coincide with the preferred velocity of the velocity demand signal. In one embodiment, the output from adder 90 is provided to drive limiter 92 to limit the signal voltage provided by PI controller 58 to MUX 52. This limits the drive current provided to motor driver block 14 during the next driving phase. The drive limit is a programmable value determined by the VCM_MAX_DRIVE signal. The driving phase then begins again as PI controller 58 provides a signal to MUX 52 corresponding to the drive current necessary to adjust the velocity of transducing head 20 to coincide with the preferred velocity of the velocity demand signal.

Disk drive head retraction control system 50 further includes stop detect circuit 56. Stop detect circuit 56 includes as its inputs a STOP_THRESHOLD signal, a NUM_THRESHOLDS signal, a STOP_TIME signal, and the output of ADC 72. Stop detect circuit 56 uses the output of ADC 72 to determine whether transducing head 20 has reached parking space 23 (FIG. 1). In one embodiment, the programmable STOP_THRESHOLD signal designates the back EMF threshold that motor 16 must reach to indicate that transducing head 20 has reached parking space 23. That is, as transducing head 20 is retracted onto parking space 23, the back EMF from motor 16 will decrease as the torque load on transducing head 20 increases when it approaches and reaches parking space 23. As a result, the threshold back EMF is programmed to coincide with the back EMF from motor 16 when it reaches parking space 23.

In one embodiment, the back EMF from motor 16 must remain at or below the STOP_THRESHOLD value for multiple chop clock cycles to further indicate that transducing head 20 has reached parking space 23. The NUM_THRESHOLDS value indicates the number of chop clock cycles the back EMF from motor 16 must remain at or below the STOP_THRESHOLD value to indicate that transducing head 20 has reached parking space 23. In one embodiment, the NUM_THRESHOLDS value is provided by a programmable register. Thus, stop detect circuit 56 counts each chop clock cycle that the back EMF from motor 16 remains at or below the STOP_THRESHOLD and compares this count to the NUM_THRESHOLDS value until the NUM_THRESHOLDS value has been reached. Alternatively, a stopped condition may be detected by sensing a direction (sign) reversal of the back EMF from motor 16.

When the NUM_THRESHOLDS value has been reached, transducing head 20 has reached parking space 23. This causes the Retract State control signal to MUX 52 to change such that the STOP_DRIVE input signal is provided to motor driver block 14. Stop detect circuit 56 subsequently stops chop clock generator circuit 54 from oscillating and holds the chop clock signal high for a programmable period of time (STOP_TIME). The STOP_DRIVE signal provides a constant drive current to the electric motor during this time to assure that transducing head 20 is fully retracted onto parking space 23. It should be noted that in a disk drive system where the final constant drive current is not necessary to fully retract transducing head 20, the value of STOP_TIME may be set to zero. Once the STOP_DRIVE signal has been provided to motor driver block 14 for the period of time designated by the STOP_TIME value, transducing head 20 is fully retracted, and the chop clock is forced low to end the retraction process.

In summary, the present invention is a control apparatus for controlling retraction of a device carried on a moveable member actuated by an electric motor after a sudden power loss. Various prior systems have been developed to limit the amount of current used when retracting the read/write head during power loss situations. However, these systems suffer from various drawbacks including the need for additional discrete components and poor accuracy of the final velocity measurement of the actuator arm. The control apparatus of the present invention avoids these drawbacks by more efficiently using the limited power available after power loss, by using existing current control circuitry, and by accurately measuring the velocity of the transducing head during the retraction process. The control apparatus includes a measuring circuit for measuring a back electromotive force (back EMF) from the electric motor during a measuring phase. The back EMF from the electric motor is used to determine an actual velocity of the moveable member. The control apparatus also includes a controller which receives the actual velocity and provides a command signal for controlling a magnitude of the drive current based on the difference between a commanded velocity and the actual velocity of the moveable member. The control apparatus further comprises a current control loop for providing a command current signal based on the current provided to the electric motor and the command signal, and for providing the electric motor with the drive current during a driving phase based on the command current signal.

Although the present invention has been described with reference to preferred embodiments, workers skilled in the art will recognize that changes may be made in form and detail without departing from the spirit and scope of the invention. Particularly, while some forms of the invention are described in the form of discrete devices, it is recognized that the circuit is preferably reduced to practice in the form of an integrated circuit (IC). Therefore, terms such as "device" and the like should be construed in their broadest contexts to include portions of ICs that are conveniently described as functional components, as well as discrete devices. Likewise, some forms of the invention are described in terms of logic gates and chips that could also be implemented by discrete devices, all within the scope and spirit of the present invention.

The invention claimed is:

1. A control apparatus for controlling retraction of a device carried on a moveable member actuated by an electric motor after a sudden power loss, the control apparatus comprising:

a measuring circuit for measuring a back electromotive force (back EMF) from the electric motor during a measuring phase, wherein the back EMF from the electric motor is related to an actual velocity of the moveable member;

a controller which receives the back EMF from the electric motor and provides a control signal for controlling a magnitude of a drive current based on a commanded velocity signal and the back EMF from the electric motor, wherein the controller includes a proportional integral controller including a proportional compensation portion and an integral compensation portion, the proportional compensation portion and the integral compensation portion each having as an input the difference between the commanded velocity and the back EMF from the electric motor; and a current control loop for providing a command current signal based on the control signal and a sensed current through the electric motor, and for providing the electric motor with the drive current during a driving phase based on the command current signal.

2. The control apparatus of claim 1, wherein the current control loop comprises:

an error amplifier for providing the command current signal based on the sensed current through the electric motor and the control signal; and an output amplifier connected across the electric motor for providing the electric motor with the drive current during the driving phase based on the command current signal.

3. The control apparatus of claim 2, wherein the error amplifier comprises an operational amplifier including a noninverting input node, an inverting input node, and an output node, the operational amplifier including a resistor and capacitor connected in series across the inverting input node and the output node and a switch connected in parallel with the resistor and capacitor, wherein the switch is open during the driving phase and wherein the switch is closed during the measuring phase.

4. The control apparatus of claim 2, wherein the controller includes a chop clock generator which alternately activates the measuring circuit during the measuring phase and the output amplifier during the driving phase.

5. The control apparatus of claim 1, wherein the proportional compensation portion includes a proportional factor and the integral compensation portion includes an integral factor, wherein the proportional factor and the integral factor are programmable to adjust speed and stability of the retraction.

6. The control apparatus of claim 1, wherein the proportional integral controller further comprises a voltage limiter to limit a magnitude of the control signal output from the controller.

7. The control apparatus of claim 6, wherein the magnitude of the control signal is limited by a programmable register connected to the voltage limiter.

8. The control apparatus of claim 1, wherein the controller comprises a stop detect circuit for determining whether the back EMF from the electric motor has reached and remained below a threshold electromotive force (EMF), the threshold EMF indicating that the device is fully retracted.

9. The control apparatus of claim 8, wherein the threshold EMF is a programmable value.

10. The control apparatus of claim 8, wherein the stop detect circuit includes a threshold counter to count a number of measuring phases the back EMF is below the threshold EMF.

11. The control apparatus of claim 10, wherein the stop detect circuit includes a programmable stop value associated with the threshold counter which establishes the number of measuring phases the back EMF is below the threshold EMF to indicate that the device is fully retracted.

12. The control apparatus of claim 11, wherein a constant drive current is applied to the electric motor for a programmable period of time to assure full retraction when the number of measuring phases the back EMF is below the threshold EMF reaches the programmable stop value.

13. The control apparatus of claim 1, wherein components of the control apparatus are fabricated in an integrated circuit.

14. The control apparatus of claim 1, wherein the device carried on the moveable member is a transducing head in a disk drive system and the electric motor is a voice coil motor.

15. A control apparatus for controlling movement of a device during both a normal operating condition and a power loss operating condition, the device carried on a moveable member actuated by a motor, the control apparatus comprising:

a multiplexer including a normal operation input, a retraction control input, a final drive input, and a multiplexer output, wherein a normal operation signal on the normal operation input is provided at the multiplexer output during the normal operating condition, and wherein a signal selected from the group consisting of a retraction control signal on the retraction control input and a final drive signal on the final drive input is provided at the multiplexer output during the power loss operating condition; and a current control loop having an input connected to the multiplexer output for providing the motor with a drive current based on a signal provided on the multiplexer output.

16. The control apparatus of claim 15, wherein the current control loop comprises:

an error amplifier for providing a command current signal based on the current provided to the motor and the signal provided on the multiplexer output; and an output amplifier connected across the motor for providing the electric motor with a drive current based on the command current signal.

17. The control apparatus of claim 16, wherein the error amplifier comprises an operational amplifier including a noninverting input node, an inverting input node, and an output node, the operational amplifier including a resistor and capacitor connected in series across the inverting input node and the output node and a switch connected in parallel with the resistor and capacitor.

18. The control apparatus of claim 15, wherein the retraction control signal is provided by a retraction control circuit for controlling retraction of the device carried on the moveable member with minimal power consumption, the retraction control circuit comprising:

a measuring circuit for measuring a back electromotive force (back EMF) from the motor during a measuring phase, wherein the back EMF from the motor is used to determine an actual velocity of the moveable member; and a controller for calculating the velocity of the movable member based on the back EMF and for providing the retraction control signal for controlling a magnitude of the drive current based on the back EMF from the motor during a driving phase.

19. The control apparatus of claim 18, wherein the controller comprises a stop detect circuit for determining whether the back EMF from the motor has reached and remained below a threshold back electromotive force (EMF), the threshold EMF indicating that the device is fully retracted.

20. The control apparatus of claim 19, wherein the threshold back EMF is a programmable value.

21. The control apparatus of claim 19, wherein the stop detect circuit includes a threshold counter to count a number of consecutive measuring phases the back EMF remains below the threshold back EMF.

22. The control apparatus of claim 21, wherein the stop detect circuit includes a programmable stop value associated with the threshold counter which establishes the number of measuring phases the back EMF is below the threshold back EMF to indicate that the device is fully retracted.

23. The control apparatus of claim 22, wherein the final drive signal on the final drive input is provided at the multiplexer output when the number of measuring phases the back EMF is below the threshold EMF reaches the programmable stop value.

24. The control apparatus of claim 23, wherein the final drive signal causes the current control loop to provide a constant drive current to the motor for a programmable period of time to assure full retraction.

25. The control apparatus of claim 15, wherein components of the control apparatus are fabricated in an integrated circuit.

26. The control apparatus of claim 15, wherein the device carried on the moveable member is a transducing head in a disk drive system and the electric motor is a voice coil motor.

27. A method of controlling retraction of a transducing head from the surface of a recordable medium after a sudden power loss, the transducing head carried on a movable arm actuated by an electric motor, the method comprising:

measuring a back electromotive force (back EMF) from the electric motor;

producing a motor drive control signal with proportional and integral compensation based on a difference between a commanded velocity signal and the back EMF from the electric motor;

producing a command current signal based on the motor drive control signal and a sensed current through the electric motor; and driving the electric motor with a drive current based on the command current signal.

28. The method of claim 27 and further comprising:

determining whether the back EMF from the electric motor has reached and remained below a threshold electromotive force (EMF), the threshold EMF indicating that the device is fully retracted.

29. The method of claim 27, wherein producing a motor drive control signal based on a commanded velocity signal and the back EMF from the electric motor:

calculating a velocity of the movable arm based on the back EME from the electric motor; and producing the motor control signal based on a difference between the velocity of the moveable arm and the commanded velocity.

* * * * *